United States Patent
Campbell

[15] 3,685,807
[45] Aug. 22, 1972

[54] APPARATUS FOR FORMING FOAM FOR USE IN WELLS

[72] Inventor: Albert E. Campbell, Mammoth Lakes, Calif.

[73] Assignee: Chevron Research Company, San Francisco, Calif.

[22] Filed: Dec. 3, 1969

[21] Appl. No.: 882,148

[52] U.S. Cl..................................259/147, 166/312
[51] Int. Cl...............................................B23c 5/06
[58] Field of Search............259/4, 151, 147, 18, 36; 175/205, 69; 166/295, 309, 270, 273, 274, 281, 312; 261/78, 88, 87

[56] References Cited

UNITED STATES PATENTS

| | | |
|---|---|---|
| 3,130,798 | 4/1964 | Schramm |
| 3,612,181 | 10/1971 | Brooks |
| 3,237,865 | 3/1966 | Kovach...................259/151 |
| 3,489,394 | 1/1970 | Stogner......................259/4 |
| 2,601,018 | 6/1952 | Heyl............................259/4 |
| 3,223,388 | 12/1965 | Knox...........................259/4 |
| 3,266,780 | 8/1966 | Waters........................259/4 |
| 3,286,992 | 11/1966 | Armeniades................259/4 |
| 3,361,412 | 1/1968 | Cole............................259/4 |

Primary Examiner—Robert W. Jenkins
Attorney—A. L. Snow, F. E. Johnston, R. L. Freeland, Jr. and E. J. Keeling

[57] ABSTRACT

A foam generator for use in mixing gas and a foamable solution to preform a foam for use as a circulating fluid in a well.

3 Claims, 3 Drawing Figures

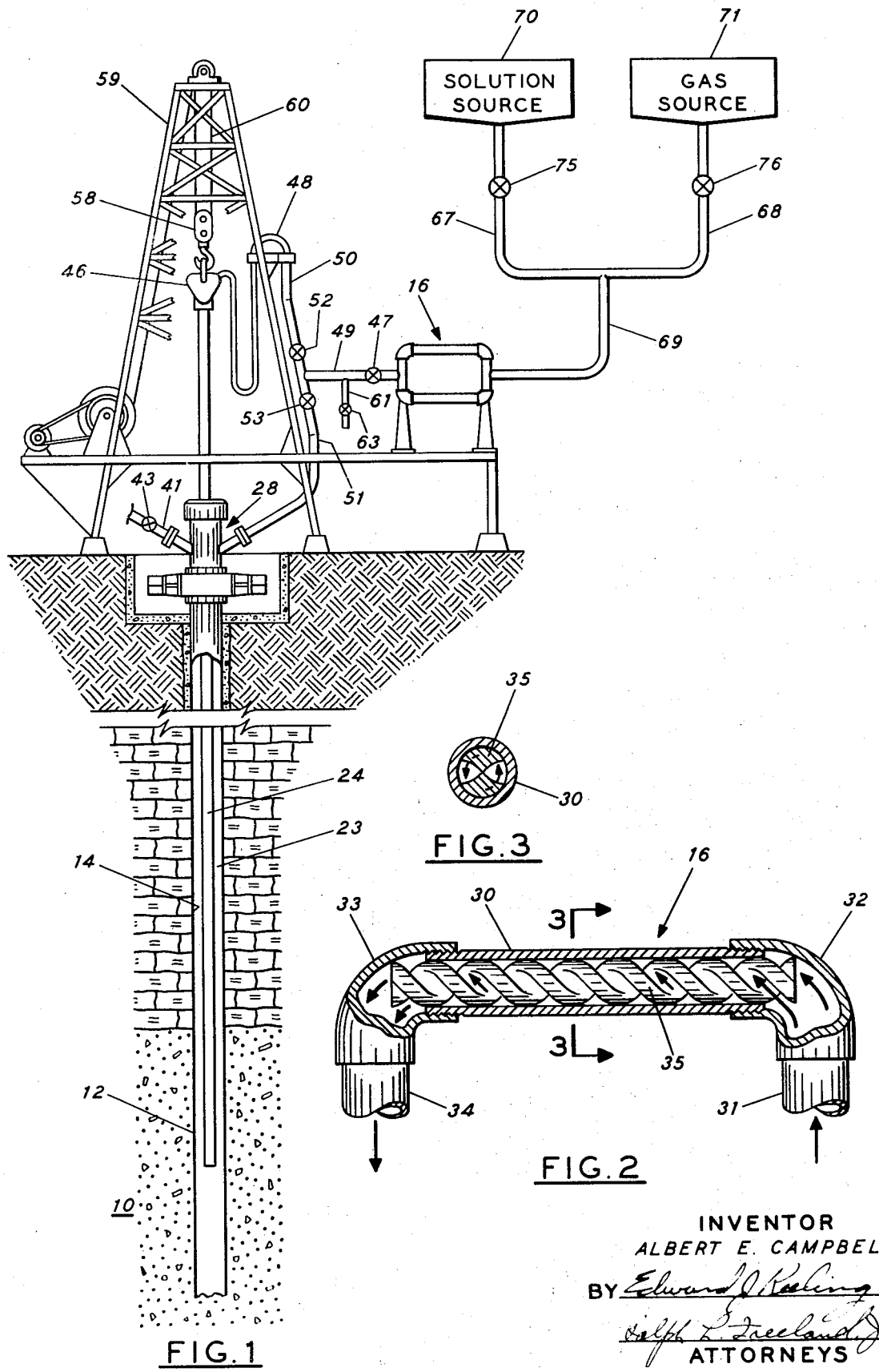

3,685,807

APPARATUS FOR FORMING FOAM FOR USE IN WELLS

CROSS REFERENCE TO RELATED APPLICATIONS

The present invention is related to the field of inventions disclosed and claimed in copending U.S. applications Ser. No. 704,832, filed Feb. 12, 1968 now U.S. Pat. No. 3,463,231; Ser. No. 720,977, filed Apr. 12, 1968 now U.S. Pat. No. 3,486,560; Ser. No. 807,766, filed Mar. 13, 1969 now abandoned; Ser. No. 835,268, filed June 20, 1969 now U.S. Pat. No. 3,559,739; Ser. No. 838,082, July 1, 1969 now U.S. Pat. No. 3,603,398 and Ser. No. 838,083, filed July 1, 1969 now U.S. Pat. No. 3,583,489.

BACKGROUND OF THE INVENTION

The invention relates to apparatus for producing foam from a foamable solution and gas, for use as a circulation fluid in an oil or gas well or the like, and, more particularly, the invention provides a foam generator for use in intimately mixing a difficulty foamable solution and a gas stream to produce a preformed foam acceptable for use as a well circulating fluid.

As has been disclosed in the above noted applications, gas and liquid foam is now used in the art as a circulating fluid in oil, gas and other wells. Foam, for example, provides an excellent low density circulating fluid for use in removing sand from well and particularly from wells penetrating relatively low pressure formations where it is desired to remove material without having the circulating fluid damage such a formation. Foam is also being used in wells to clean well liners which become plugged by materials such as asphaltene deposits an scale. Foam is also used as a circulating fluid for placing material in wells and into formations penetrated by wells. The above described techniques require that a stable preformed foam be formed, usually at the earth's surface, for circulating in a well. It is also important that the foam be formed with a minimum pressure drop in the generating apparatus. There is thus a need for a foam generator to form a stable preformed foam, with a minimum pressure drop in the foam circulating system used in wells.

SUMMARY OF THE INVENTION

The present invention is directed to apparatus for preforming foam for use as a circulating fluid in a well. The invention includes a foam generator which is connected to a source of gas and a source of liquid foamable solution. The generator includes a tubular member having a gas-foamable solution entry formed at one end and a foam exit formed at the other end. A helical insert is located within the tubular member to provide a swirling action and to cause the gas-foamable solution to be intimately mixed to form a stable foam at the exit end thereof. The exit end of the tubular member is connected to either a tubing string or to a well annulus for circulating the preformed foam in a well. The foam generating apparatus thus provides a stable preformed foam suitable for use in well operations.

BRIEF DESCRIPTION OF THE INVENTION

The apparatus of the present invention includes a foam generator which is connected to a source of gas and a source of liquid foamable solution. The generator comprises a tubular member having a helical insert positioned therein. One end of the tubular member is provided with a gas-foamable solution into the tubular member along the longitudinal axis thereof. The foamable solution contacts the helical insert and is caused to move in a swirling manner down the interior of the tubular member. This swirling action causes intimate mixing of the gas-foamable solution mixture and results in the formation of a stable foam. A foam exit is provided on the end of the tubular member downstream of the gas-foamable solution entry. The foam exit is connected to a conduit, and this conduit is connectable to a well. Foam from the foam generator is injected into such a well for use therein.

OBJECTS OF THE INVENTION

A particular object of the present invention is to provide apparatus for preforming a stable foam suitable for use in well operations. Further objects and advantages of the present invention will become apparent from the following detailed description read in light of the accompanying drawings which are made a part of this specification.

BRIEF DESCRIPTION OF THE DRAWINGS

FIG. 1 is an elevation view, partially in section, of the preferred embodiment of apparatus assembled in accordance with the present invention for preforming foam for use in well operations;

FIG. 2 is an enlarged view, partially in section, of the preferred foam generator assembled in accordance with the invention; and FIG. 3 is a sectional view taken at line 3—3 of FIG. 2.

DESCRIPTION OF THE PREFERRED EMBODIMENT

Refer now to the drawings and to FIG. 1 in particular, where the preferred embodiment of apparatus assembled in accordance with the invention is illustrated. FIG. 1 shows an elevation view, partially in section, of a well which penetrates the earth to an oil-bearing formation 10. This is a general environment where the apparatus of the present invention finds utility. The portion of the well adjacent the producing formation 10 contains a perforated or otherwise suitably slotted well liner 12. The well liner 12 is connected to suitable casing 14 which extends from the upper portion of the producing formation through the earth to the surface. The well liner is placed during completion of the well, and oil from the producing formation enters the well through the slots in the well liner 12. Sand may also enter the well through such slots and collect in the well and eventually hinder production therefrom. In accordance with the present invention, foam is circulated to remove such sand and other undesirable material from the well. The present invention is also useful, of course, when initially drilling the well to remove cuttings and the like from the well, and also to circulate material in the well.

In accordance with the preferred form of the invention, a foam generator, generally indicated by the number 16, is connected through suitable valves 75 and 76 to a foamable solution source 70 and a gas source 71. Foam is formed by mixing the foamable solution and the gas together in the foam generator. The foam must be preformed and have good lifting capability in order to efficiently remove chips, sand and gravel from the well. The gas source and the foamable solution source are connected to one end of the foam generator 16 by suitable conduits 67, 68 and 69. Valve 75 on solution conduit 67 controls the amount of foamable solution which is used to generate the foam in the foam generator 16. Valve 76 on gas conduit 68 controls the flow of gas from gas source 71 to the foam generator 16. The solution conduit 67 and the gas conduit 68 are brought together in a common flow conduit 69 for entry into the foam generator 16.

A conduit 49 connects the outlet of the foam generator 16 to the well. This conduit is connected to provide foam to either or both the well annulus 23 or to a tubing or drill string 24 located in the well. Thus normal circulation, i.e., down the tubing and up the annulus; reverse circulation, i.e., down the annulus and up the tubing; and simultaneous injection down both the tubing and annulus may be done. Conduit 49 is connected to the tubing string 24 through flexible conduit 48, conduit 50 and power swivel 46. Valve 52 is used to control foam flow to the tubing string Conduit conduit 49 is connected to the well annulus 23 by means of conduit 51 via wellhead 28. Valve 53 controls foam flow from the foam generator 16 to the well annulus 23. A bleed line 61, having a control valve 63, is connected to conduit 49 for bleeding the foam line should this be necessary.

The tubing string 24 is positioned in the well through a suitable wellhead 28. The particular size and type of the tubing or drill string will depend on the particular well operations. Both segmented and continuous tubing strings are useful in the present invention. The lower end of the tubing string 24 is positioned in the well adjacent where sand or other undesirable material to be removed is located. The tubing string and the well liner 12-well casing 14 form a well annulus 23. A normal path for circulating foam through the well is provided down the interior of the tubing string 24 and up the well annulus 23. A blooie line 41 is connected to the well annulus 23 at wellhead 28 for exhausting foam from the annulus 23. A valve 43 controls flow through blooie line 41 and may be used to control the back pressure placed on foam being circulated in the well. The tubing string may be raised or lowered in the well during foam circulation by suitable hoist means which includes a traveling block 58 which is moved by suitable cables 60. A conventional derrick 59, or other suitable mast, is used to support the traveling block. The power swivel 46 which is connected to the upper end of the tubing string 24 is connected to the traveling block 58 and moves the tubing string up and down when the traveling block is moved up and down.

The foam for use as the circulating media in the above described apparatus is formed by bringing together a foamable solution and a suitable gas. The preferred liquid foamable solution is an aqueous surfactant solution. Numerous gases are available for use with such a liquid surfactant solution to form a foam. Such gases include air, nitrogen, natural gas and carbon dioxide. Because of its availability and low cost, air is usually the preferred gas. However, nitrogen and natural gas, when available, have an advantage over air in that the danger of fire in an oil well is reduced. Often these gases are available in an oil field at high pressure from an underground formation and when so available provide an excellent gas for the foam. Suitable foams and specific surfactants which go into the foamable solutions are described in detail in application Ser. No. 704,832 filed Feb. 12, 1968 and now U. S. Pat. No. 3,463,231 and the disclosure of such application is incorporated herein by reference. The preferred surfactant for use in the present invention is a $C_{11}$—$C_{14}$ alkylbenzene sulfonate (ABS) preferably the ammonia salt. The surfactant should be added to water to form a foamable solution in an amount between 0.5 to 1.0 parts by weight per 100 parts of water. A foamable solution is mixed with a gas in the foam generator in a manner as set out in detail below.

An enlarged sectional view of the preferred foam generator assembled in accordance with the invention is shown in FIG. 2. The foam generator 16 comprises a tubular member 30 connected to a conduit 31 which provides for flow of surfactant solution and gas into the tubular member parallel to the longitudinal axis thereof. A suitable elbow joint 32 is used to make this connection. The downstream end of the tubular member 30 is connected by means of elbow joint 33 to a foam conduit 34. The foam formed in the tubular member is directed to a well through conduit 34. The interior of the tubular member 30 contains a helical insert 35. The helical insert is preferably held in place within the tubular member by means of constrainment by the elbow joints 32 and 33. The helical insert cooperates with the interior of the tubular member to cause a stable foam to be formed for removal from the tubular member 30 through conduit 34. In demonstrations conducted to show the advantages of the present foam generator, helical inserts having a one-inch outside diameter where used in tubular members having an inside diameter of slightly more than one inch. The helical inserts were in the form of a regular helix 11 inches long and had a pitch of 1½ inches. The shaft of the insert was five-sixteenths inch and there were eight turns to the helix. A pair of the tubular members each containing a helical insert where hooked in parallel to provide a useful stable foam in accordance with the invention. As noted in the preferred form of the invention, two tubular members as described above and as shown in FIG. 1 are hooked in parallel to provide a preformed foam for use in a well. The dual arrangement provides for increased efficiency in the foam-producing operation.

The present invention discloses a foam generator which is used to preform foam for use in a circulating system of a well. Although certain specific embodiments of the apparatus have been disclosed, the invention is not to be limited to only such embodiments but is meant to include all embodiments coming within the scope of the appended claims.

I claim:

1. Apparatus providing foam for use in a well comprising a foamable solution source, a gas source, a hollow tubular member, conduit means connecting said gas source and said foamable solution source to one end of said tubular member for flowing gas and foamable solution into said tubular member along the longitudinal axis thereof, a regular multiple helical insert in said tubular member to cause said gas and foamable solution to swirl down said tubular member, a foam outlet on the other end of said tubular member and foam conduit means connecting the foam outlet of said tubular member with a well.

2. The apparatus of claim 1 further characterized by a pair of tubular members, each containing a helical insert, connected in parallel to the conduit means carrying the foamable solution and gas and the foam conduit means.

3. A method of providing stable foam for use in well operations comprising flowing gas from a gas source to a conduit, flowing a foamable solution from a foamable solution source to said conduit, mixing said gas and said foamable solution together in said conduit in proportions suitable for making stale foam, flowing said mixed gas and foamable solution in said conduit in a helical pattern through at least a portion of said conduit to form stable foam and injecting said stable foam down a well for use therein.

* * * * *